United States Patent
Liu et al.

(10) Patent No.: US 7,619,753 B2
(45) Date of Patent: Nov. 17, 2009

(54) METHOD FOR MEASURING DIMENSIONS AND OPTICAL SYSTEM USING THE SAME

(75) Inventors: An-Shun Liu, Hsinchu (TW); Yi Sha Ku, Hsinchu (TW); Nigel Peter Smith, Hsinchu (TW)

(73) Assignees: Industrial Technology Research Institute, Hsinchu County (TW); Accent Optical Technologies, Inc., Burbank, CA (US)

( * ) Notice: Subject to any disclaimer, the term of this patent is extended or adjusted under 35 U.S.C. 154(b) by 306 days.

(21) Appl. No.: 11/465,802

(22) Filed: Aug. 19, 2006

(65) Prior Publication Data

US 2007/0188771 A1   Aug. 16, 2007

(30) Foreign Application Priority Data

Feb. 10, 2006   (TW) .............................. 95104801 A

(51) Int. Cl.
*G01B 11/14* (2006.01)
(52) U.S. Cl. .................... 356/625; 356/614; 356/630
(58) Field of Classification Search ......... 356/614–625, 356/627, 630, 634, 635
See application file for complete search history.

(56) References Cited

U.S. PATENT DOCUMENTS

| | | | | |
|---|---|---|---|---|
| 5,251,011 A | * | 10/1993 | Fujiwara et al. | 356/624 |
| 5,361,137 A | * | 11/1994 | Aton et al. | 356/636 |
| 6,137,578 A | * | 10/2000 | Ausschnitt | 356/622 |
| 6,906,782 B2 | * | 6/2005 | Nishi | 355/53 |

* cited by examiner

*Primary Examiner*—Gregory J Toatley, Jr.
*Assistant Examiner*—Iyabo S Alli
(74) *Attorney, Agent, or Firm*—Egbert Law Offices PLLC

(57) ABSTRACT

A method of measuring dimensions for an optical system to measure the critical dimension of a sample object according to this aspect of the present invention includes the steps of preparing a plurality of standard objects, selecting a predetermined focus metric algorithm, performing an analyzing process on each standard object to generate a plurality of focus metric distributions using the predetermined focus metric algorithm, analyzing the focus metric distributions to determine a target order, generating a reference relation, acquiring a measured characteristic value from the sample object, and determining the critical dimension of the sample object based on the measured characteristic value and the reference relation. Each standard object has a grating-shaped standard pattern with a predetermined pitch and line width. The focus metric algorithm is a gradient energy method, a Laplacian method, a standard deviation method, or a contrast method.

20 Claims, 15 Drawing Sheets ns according to the prior art. The optical system comprises a lens 102 configured to acquire images of an object 100 with

METHOD FOR MEASURING DIMENSIONS AND OPTICAL SYSTEM USING THE SAME

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a method for measuring dimensions and an optical system using the same, and more particularly, to a method for measuring dimensions incorporating the through focus image-capturing technique and the focus metric algorithms and an optical system using the same.

2. Description of Related Art Including Information Disclosed Under 37 CFR 1.97 and 37 CFR 1.98

With the rapid growth and development of the semiconductor industry, the requirement to reduce the critical dimension (CD) and line-width has increased, and the precision of metrology tools must be raised to meet demands. According to Rayleigh criteria, it is quite difficult for conventional image metrology tools to meet the prospective resolution demands due to issues such as optical diffraction, precision of metrology tools and proximity effect. Consequently, it is necessary to find a new metrology to solve the above-mentioned problems. In addition, the metrology tools for measuring line-width and pitch, such as critical dimension scanning electron microscope (CD-SEM) and critical dimension atomic force microscope (CD-AFM) offer very high resolution, but are too expensive for most applications. Users need cost-effective and efficient image metrology tools, these can achieve the same resolution as CD-SEM and CD-AFM.

The conventional through focus method is proposed to increase the precision of metrology tools. The through focus method acquires multiple images and characteristic values from the image, and builds a relation of the characteristic value and the structural parameter such that an unknown structure parameter can then be determined based on the built relation. Consequently, the conventional image metrology tools can dramatically increase the precision without increasing the hardware cost, which has become an important approach for the image metrology tools in overcoming the optical diffraction limit issue. However, one critical factor to improve the precision of image metrology tools is developing a means of using this approach combined with a continuously improved algorithm to precisely determine unknown structural parameters.

FIG. 1 illustrates an optical system for measuring dimensions according to the prior art. The optical system comprises a lens 102 configured to acquire images of an object 100 with the lens 102 focusing on an imaging position 104, and an image sensor 106 positioned behind the imaging position 104 and configured to store the acquired images of the object 100 in a digital manner. The object 100 towards the lens 102 has an on-focus position, and the object 100 can be moved to an off-focus position from the on-focus position.

FIG. 2(*a*) and FIG. 2(*b*) are acquired images of the object 100 at an on-focus position and an off-focus position. The grating pattern of the object 100 is very clear if the object 100 is positioned at the on-focus position, as shown in FIG. 2(*a*). In contrast, the grating pattern of the object 100 is very unclear if the object 100 is moved to an off-focus position, as shown in FIG. 2(*b*). The conventional technique acquires a plurality of images at different positions, and the on-focus position is then determined based on the degree of clarity of the images. However, as the critical dimension shrinks down to below the resolution limit of the optical system, the grating pattern is not clear even if the object 100 is positioned right on the on-focus position, and the limitation of the conventional technology become apparent.

BRIEF SUMMARY OF THE INVENTION

One aspect of the present invention provides a method for measuring dimensions incorporating the through focus image-capturing technique and the focus metric algorithms and an optical system using the same, which can accurately calculate a measured critical dimension based on a prepared characteristic database in advance, wherein the characteristic values in the characteristic database cover a sufficient range of possible line widths.

A method of measuring dimensions for an optical system to measure the critical dimension of a sample object according to this aspect of the present invention comprises the steps of preparing a plurality of standard objects, selecting a predetermined focus metric algorithm, performing an analyzing process on each standard object to generate a plurality of focus metric distributions using the predetermined focus metric algorithm, analyzing the focus metric distributions to determine a target order, generating a reference relation, acquiring a measured characteristic value from the sample object, and determining the critical dimension of the sample object based on the measured characteristic value and the reference relation. Each standard object has a grating-shaped standard pattern with a predetermined pitch, line width, and other structural parameters.

Particularly, performing an analyzing process on each standard object includes moving the standard object to a plurality of predetermined positions with respect to the optical system, acquiring a plurality of images of the standard object on the predetermined positions using the optical system and analyzing the images using the predetermined focus metric algorithm to generate a plurality of focus metric distributions of a focus metric values on the predetermined positions, wherein each focus metric distribution has at least one extreme value. In addition, the step of analyzing the focus metric distributions is performed to determine a target order from at least one extreme value as well as a plurality of characteristic values corresponding to the target orders of focus metric distributions, and the step of generating a reference relation is performed for correlating the characteristic values with the line widths of the standard objects.

The step of generating a reference relation includes a curve fitting process to generate a theoretical relation curve for correlating the characteristic values with the line widths of the standard objects. The step of generating a reference relation further includes a process of correlating the characteristic values with the different pitches of the standard objects. Furthermore, the target order is a 0 order peak, a +1 order peak or a −1 order peak. The characteristic values are calculated based on the focus metric algorithm and correspond to peak values of the target orders. The characteristic value can be calculated based on the focus metric algorithms and correspond to one calculated value of the predetermined positions in the target order. The predetermined positions use an on-focus position as a reference position. In addition, the target order is determined by the steps of normalizing the focus metric distribution based on a 0 order peak thereof, and selecting a peak or a valley other than the 0 order peak as the target order. The characteristic values are obtained based on the focus metric algorithm, and correspond to a +1 order or a −1 order. The focus metric algorithm can be a gradient energy method, a Laplacian method, a standard deviation method, or a contrast method.

A method of measuring dimensions for an optical system to measure the critical dimension of a sample object according to another aspect of the present invention comprises the steps of using the optical system to acquire a plurality of images from a plurality of objects having a grating-shaped standard pattern with a predetermined pitch and a plurality of line widths, using an algorithm to analyze the images to generate a plurality of characteristic distributions corresponding to the line widths, determining characteristic values for the characteristic distributions to generate a relation curve of the characteristic values and the line widths, acquiring a measured characteristic value from the sample object, and determining a critical dimension of the sample object based on the measured characteristic value and the relation curve.

Another aspect of the present invention provides an optical system of measuring dimensions of a sample object comprising a database configured to store at least one characteristic relation curve of a pitch and a measuring unit configured to acquire a measured characteristic value of the sample object. The characteristic relation curve correlates a characteristic value with the pitch, and the critical dimension of the sample object is determined based on the characteristic value and the characteristic relation curve. The characteristic value can be an extreme value obtained by a focus metric algorithm, and corresponds to one of the peaks or valleys of the characteristic relation curve.

BRIEF DESCRIPTION OF THE SEVERAL VIEWS OF THE DRAWINGS

The objectives and advantages of the present invention will become apparent upon reading the following description and upon reference to the accompanying drawings.

DETAILED DESCRIPTION OF THE INVENTION

The present invention can use conventional inexpensive optical image metrology tools to perform the critical dimension measurement in a high accuracy manner. Particularly, the present invention can use conventional optical image metrology tools, the through focus image-capturing technique and the focus metric algorithm to perform critical dimension measurement based on the relation of characteristic values obtained from focus metric algorithms and the structural parameters. Consequently, the present invention can increase the measuring efficiency of the optical image metrology tools and the sensitivity of the critical dimension measurement without amending the hardware architecture. First, some image-analyzing algorithms are introduced below. The clarity of the image depends on the magnitude of the off-focus offset, and the present invention can use conventional gradient energy method, standard deviation method, contrast method or Laplacian method. In addition, it is quite easy to calculate the focus metric measure of the image since the image is stored digitally according to the present invention.

Using $g_i(x,y)$ to represent the intensity of a pixel i of the image at a position (x, y), the gradient energy method can be expressed as the following equation:

$$FM_{GE} = \sum_x \sum_y ((\hat{S}_x \cdot \hat{g}_i(x, y))^2 + (\hat{S}_y \cdot \hat{g}_i(x, y))^2)$$

$$\hat{S}_x \cdot \hat{g}_i(x, y) =$$
$$\frac{1}{4}(-g_i(x-1, y-1) + g_i(x+1, y-1) - 2g_i(x-1, y) + 2g_i(x+1, y) -$$
$$g_i(x-1, y+1) + g_i(x+1, y+1))$$

$$\hat{S}_y \cdot \hat{g}_i(x, y) = \frac{1}{4}(-g_i(x-1, y-1) + g_i(x+1, y-1) - 2g_i(x, y-1) +$$
$$2g_i(x, y+1) - g_i(x-1, y+1) + g_i(x+1, y+1))$$

The Laplacian method can be expressed as the following equation:

$$FM_{LAP} = \sum\sum (L_{xx} + L_{yy})^2$$

$$L_{xx} + L_{yy} = -g_i(x-1, y-1) - 4g_i(x-1, y) -$$
$$g_i(x-1, y+1) - 4g_i(x-1, y-1) + 20g_i(x-1, y) -$$
$$4g_i(x-1, y+1) - g_i(x-1, y-1) - 4g_i(x-1, y) - g_i(x-1, y+1)$$

The standard deviation method can be expressed as the following equation:

$$FM_{Std} = \sqrt{\frac{\sum_x \sum_y |g_i(x,y) - \bar{g}|^2}{n-1}}$$

The contrast method can be expressed as the following equation:

$$FM_{Contrast} = \frac{g_i(x,y)_{max} - g_i(x,y)_{min}}{g_i(x,y)_{max} + g_i(x,y)_{min}}$$

Figure 1:
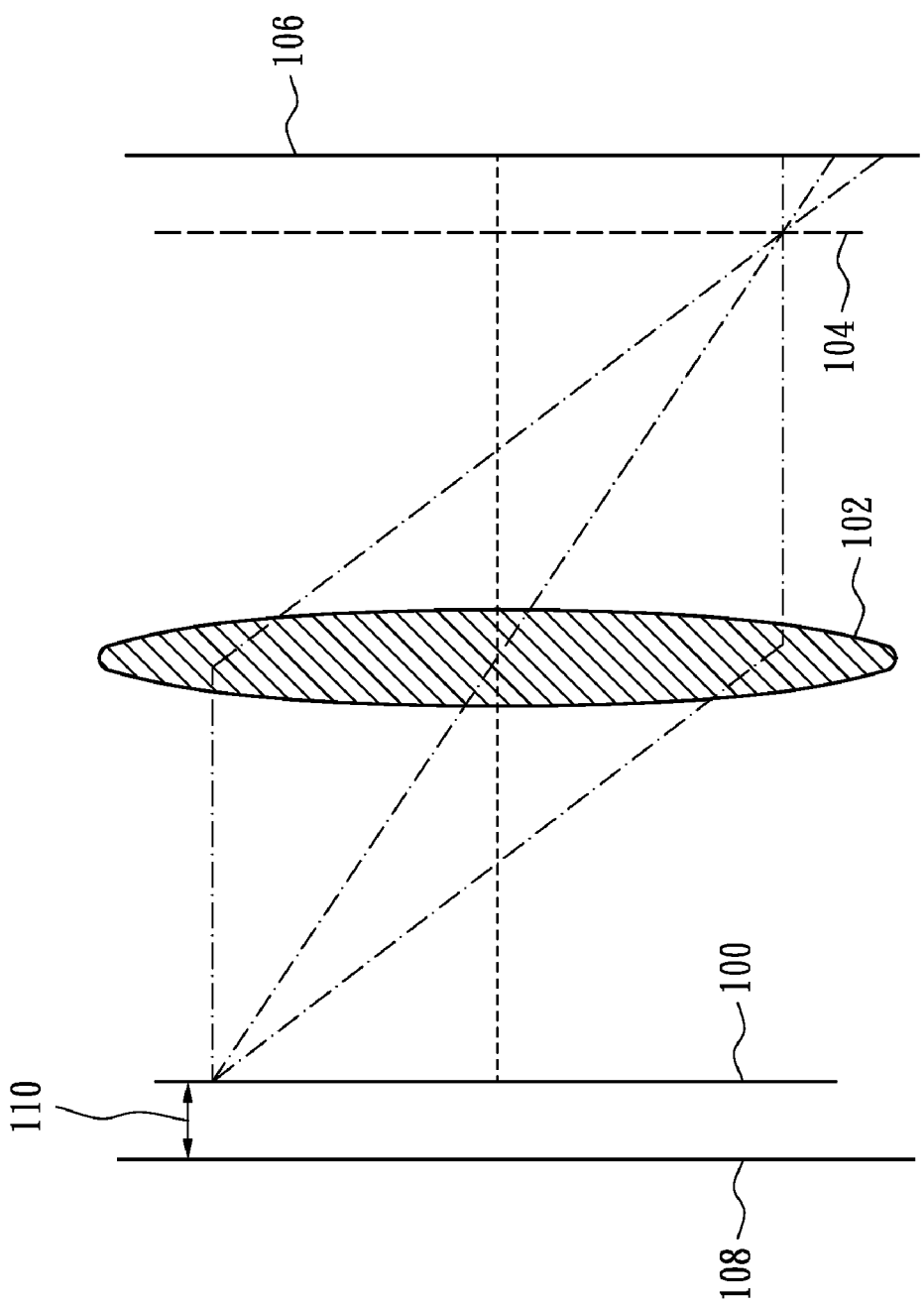
FIG. 1 is a schematic view of an illustration of an optical system for measuring the dimension according to the prior art.
Figure 2B:
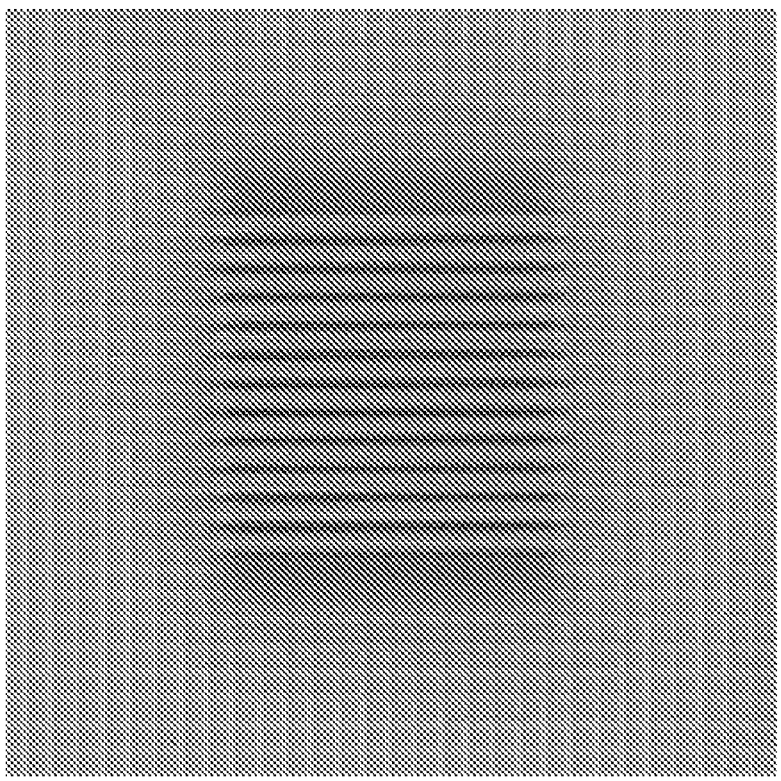
FIG. 2(a) and FIG. 2(b) are acquired images of the object at an on-focus position and an off-focus position.
Figure 2A:
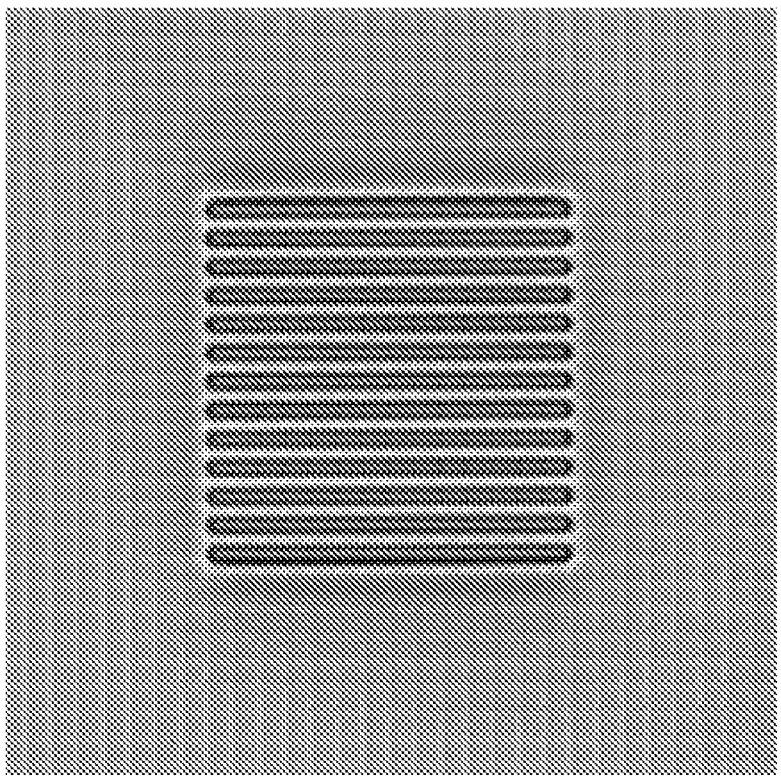
Figure 3:
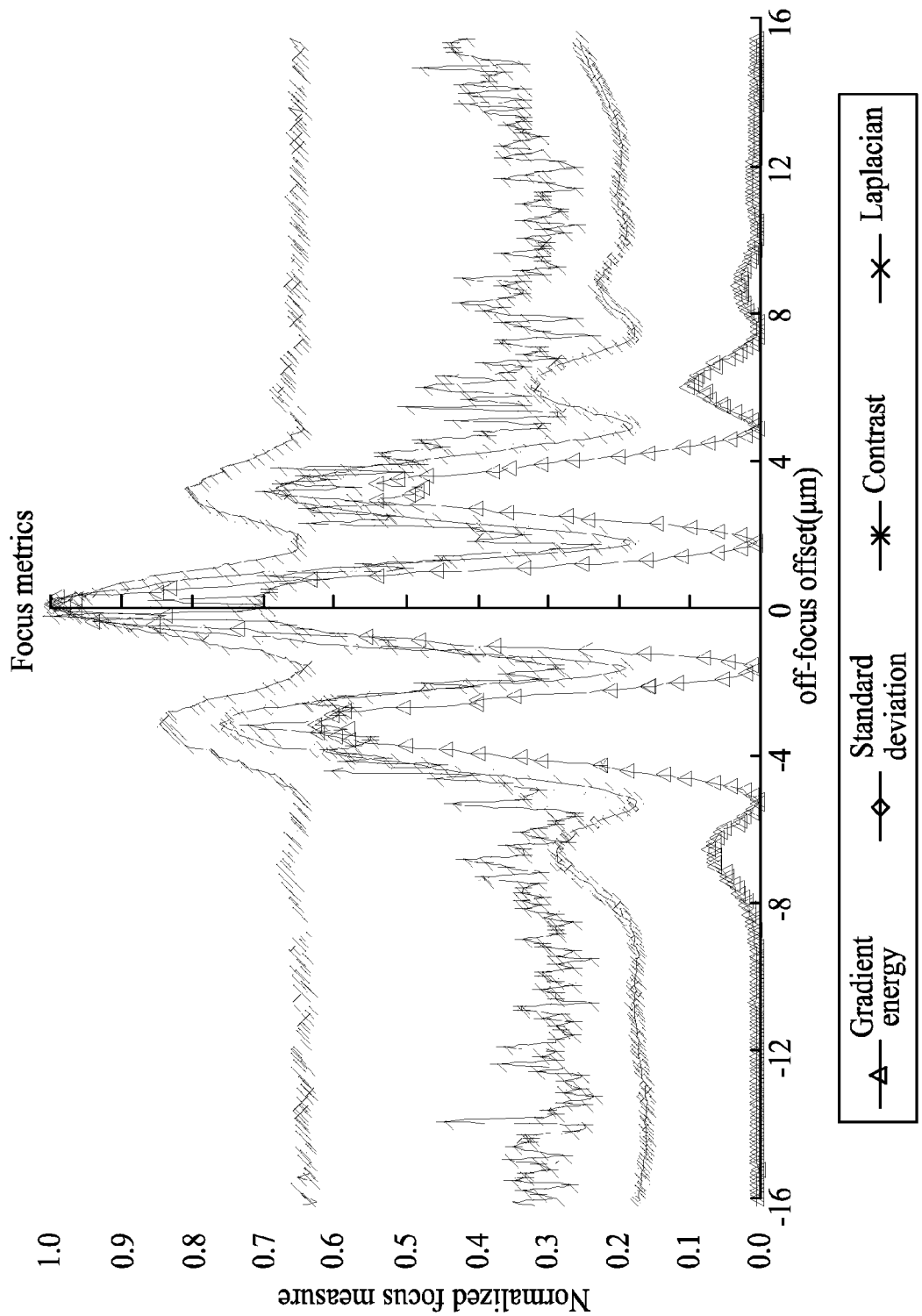
FIG. 3 shows a graph illustration of the relation curve of the off-focus offset and the normalized focus measure obtained from the above-mentioned four focus algorithms according to one embodiment of the present invention.

FIG. 3 shows the distribution curve of four focus metric algorithms, i.e., the focus metric distribution, of the off-focus offset and the normalized focus measure, i.e., focus metric value, calculated from the above-mentioned four focus metric algorithms according to one embodiment of the present invention. The images used to calculate the distribution curve are captured from a standard grating pattern. The images include an on-focus image and several off-focus images, and the off-focus offset is within ±16 μm. The detailed calculation process of the above-mentioned method are well known in the prior art, and not described herein. The distribution curves calculated by the four focus metric algorithms are different from one another, but all possess several similar peaks. The largest peak corresponds to the on-focus image and called as 0 order peak. In addition to the 0 order peak, there are several smaller peaks due to the optical diffraction effect, and these peaks are called as +1 order peak, −1 order peak, and so forth. Obviously, the normalized focus measure corresponds to structural parameters such as the critical dimension, and this relationship can be used to determine the magnitude of the structural parameter of an unknown object.

Figure 4:
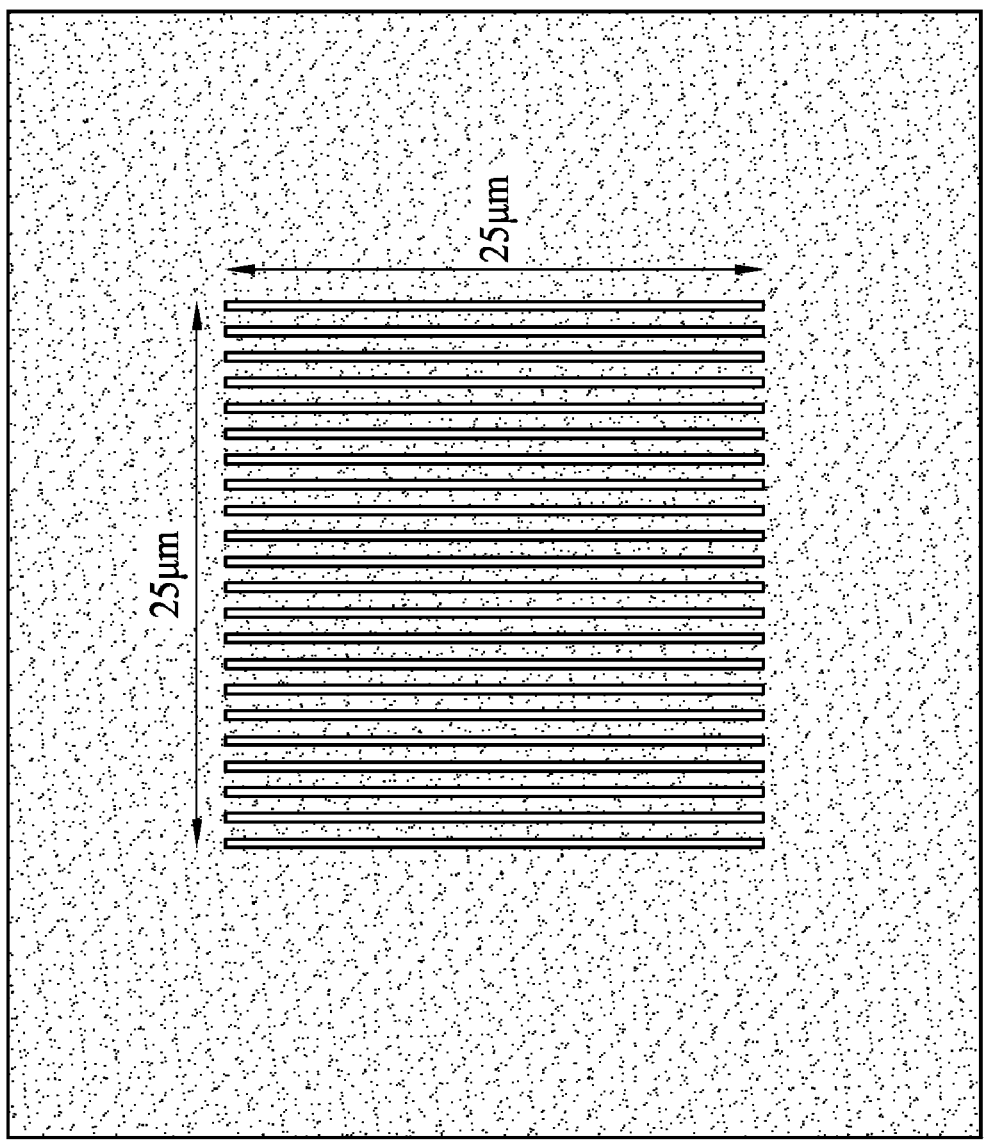
FIG. 4 is a top schematic view of a standard grating pattern with a rectangular shape of 25 μm according to one embodiment of the present invention.
Figure 5:
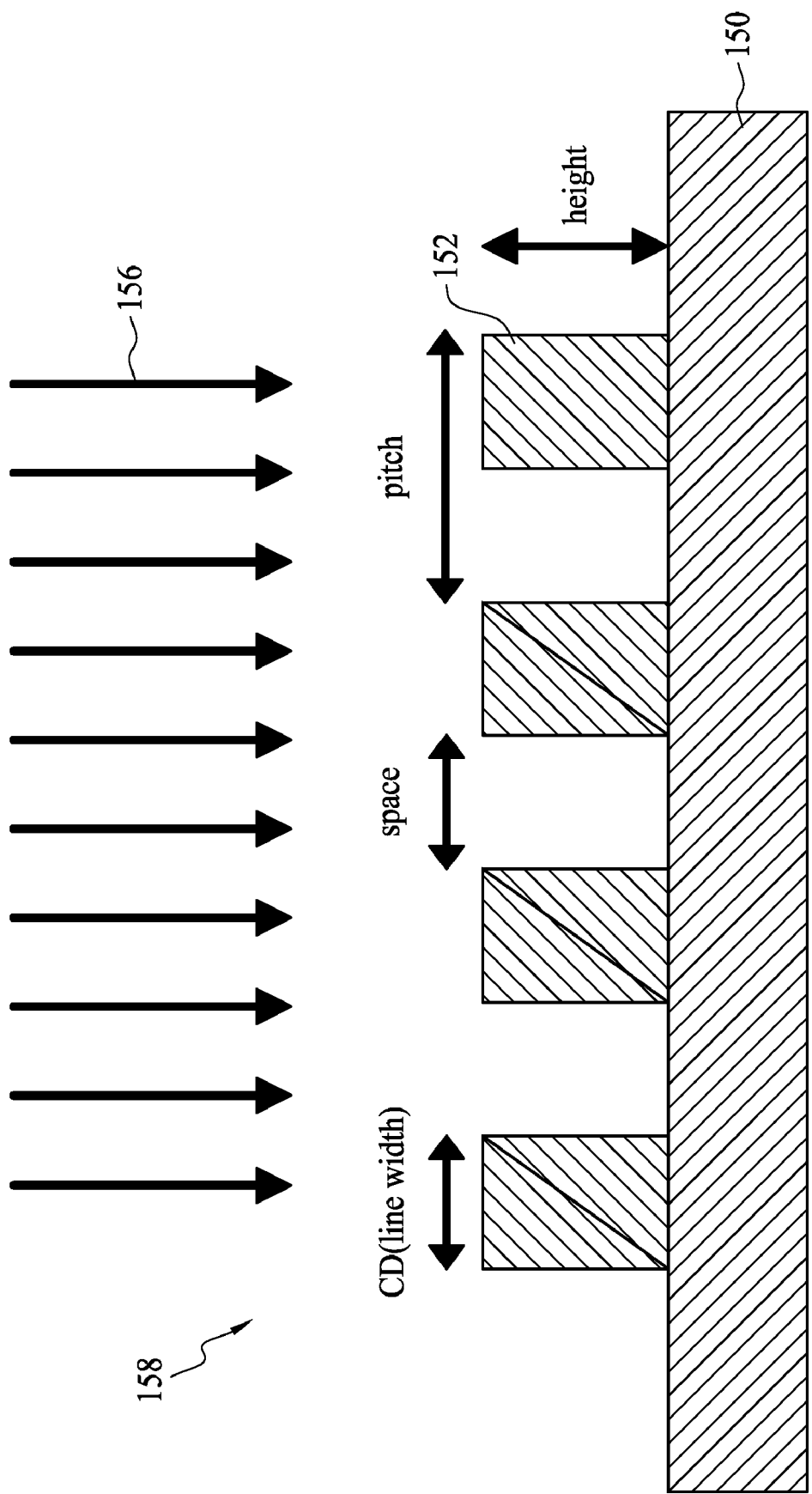
FIG. 5 is a cross-sectional view of the standard grating pattern according to one embodiment of the present invention.

FIG. 4 is a top view of a standard grating pattern 158 having a rectangular shape of 25 μm according to one embodiment of the present invention, and FIG. 5 is a cross-sectional view of the standard grating pattern 158 according to one embodiment of the present invention. The standard grating pattern 158 includes a plurality of line-shaped patterns 152 positioned on a substrate 150 in a parallel manner. The line-shaped patterns 152 have a predetermined height and line width, two adjacent line-shaped patterns 152 are separated by space, and the summation of the line width and the space is defined as a pitch. The line-shaped patterns 152 can be made of photoresist material such as ZEP 520, and the substrate 150 can be a silicon substrate. Furthermore, several types of line-shaped patterns having different pitches and line widths can be prepared on the substrate 150, and each type of line-shaped pattern can be considered as an individual standard object. As a probing light is used to measure the standard grating pattern 158, there are different images if there are lines having different line width, and the focus measure (focus metric value) will be different, which will be described in more detail below.

Figure 6:
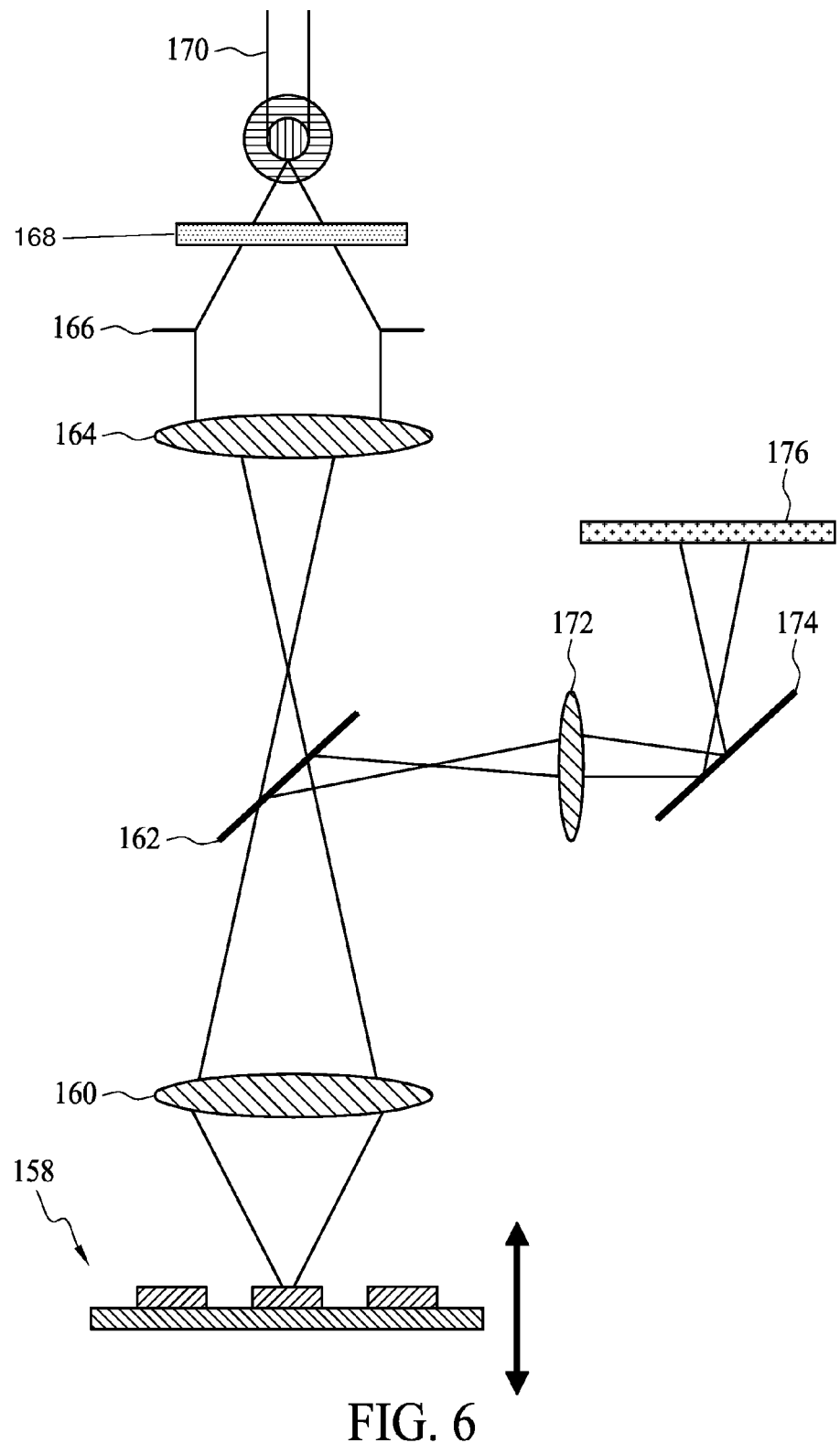
FIG. 6 is a schematic view of an illustration of an optical system configuration for measuring the standard grating pattern according to the present invention.

FIG. 6 illustrates an optical system for measuring the standard grating pattern 158 according to the present invention. The optical system includes an objective lens 160, a beam splitter 162, a condenser lens 164, a diaphragm 166, a color filter 168, a light source 170, a tube lens 172, a reflection lens 174 and an image sensor 176. The optical system uses the image sensor 176 to capture the image of the standard grating pattern 158, which can be moved in relation to the lens 160, such as moving the translational stage forward and backward towards the lens in 8 μm range, and the moving displacement is defined as the off-focus offset.

Figure 7:
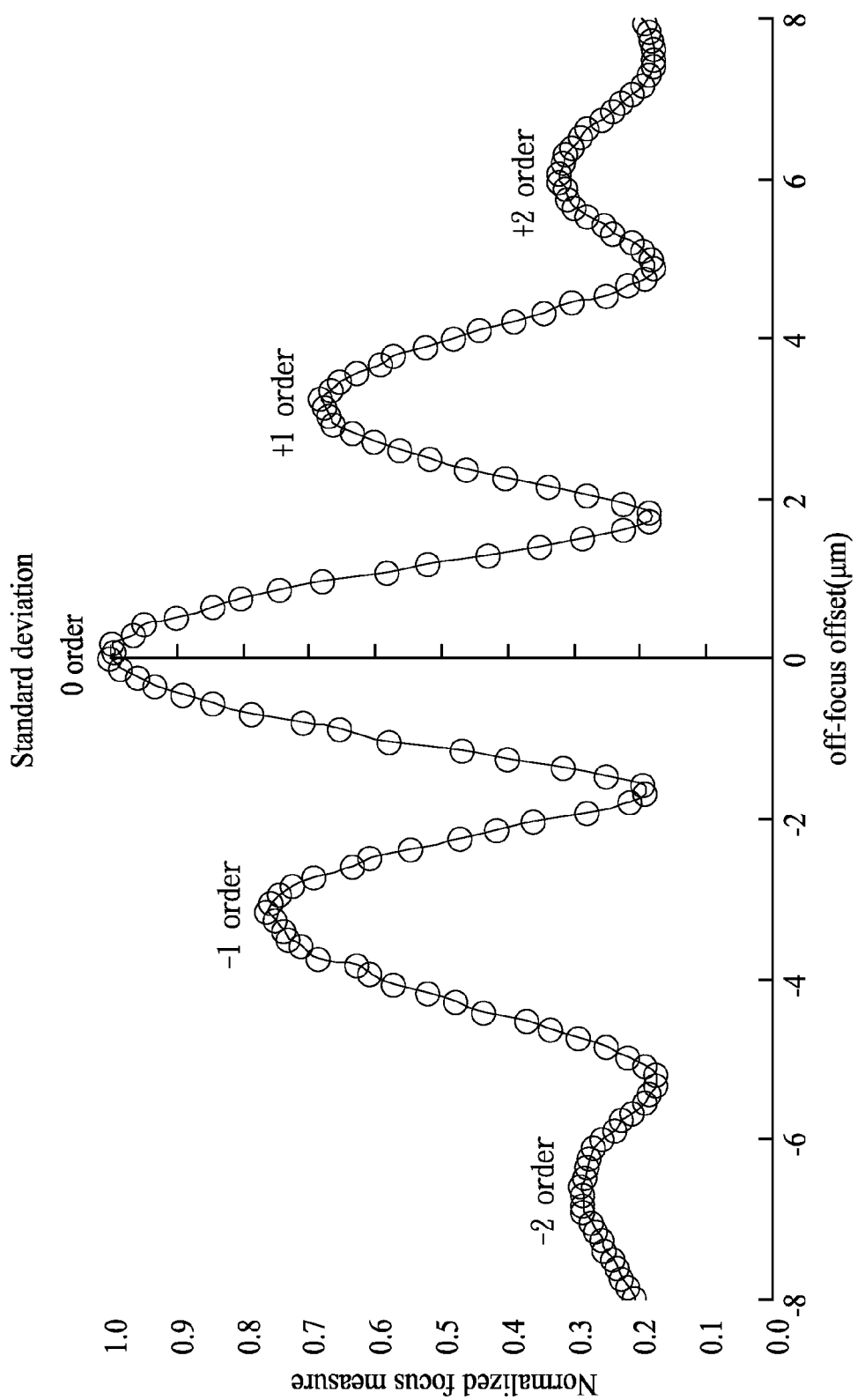
FIG. 7 shows a graph illustration of the relation curve of the off-focus offset and the normalized focus measure calculated by the standard deviation method according to one embodiment of the present invention.

FIG. 7 shows the distribution curve (the focus metric distribution) of the off-focus offset and the normalized focus measure calculated from the standard deviation method according to one embodiment of the present invention. Theoretically, the optical system can capture an image having a best clarity at the best focus position if the standard grating pattern is moved in a sufficiently large range. The off-focus offset of the best focus position is set as 0, and the corresponding peak is defined as the 0 order, while the other peaks are defined as the ±1 order, ±2 order, and so forth. In addition, the valley can also be defined similarly.

Figure 8A:
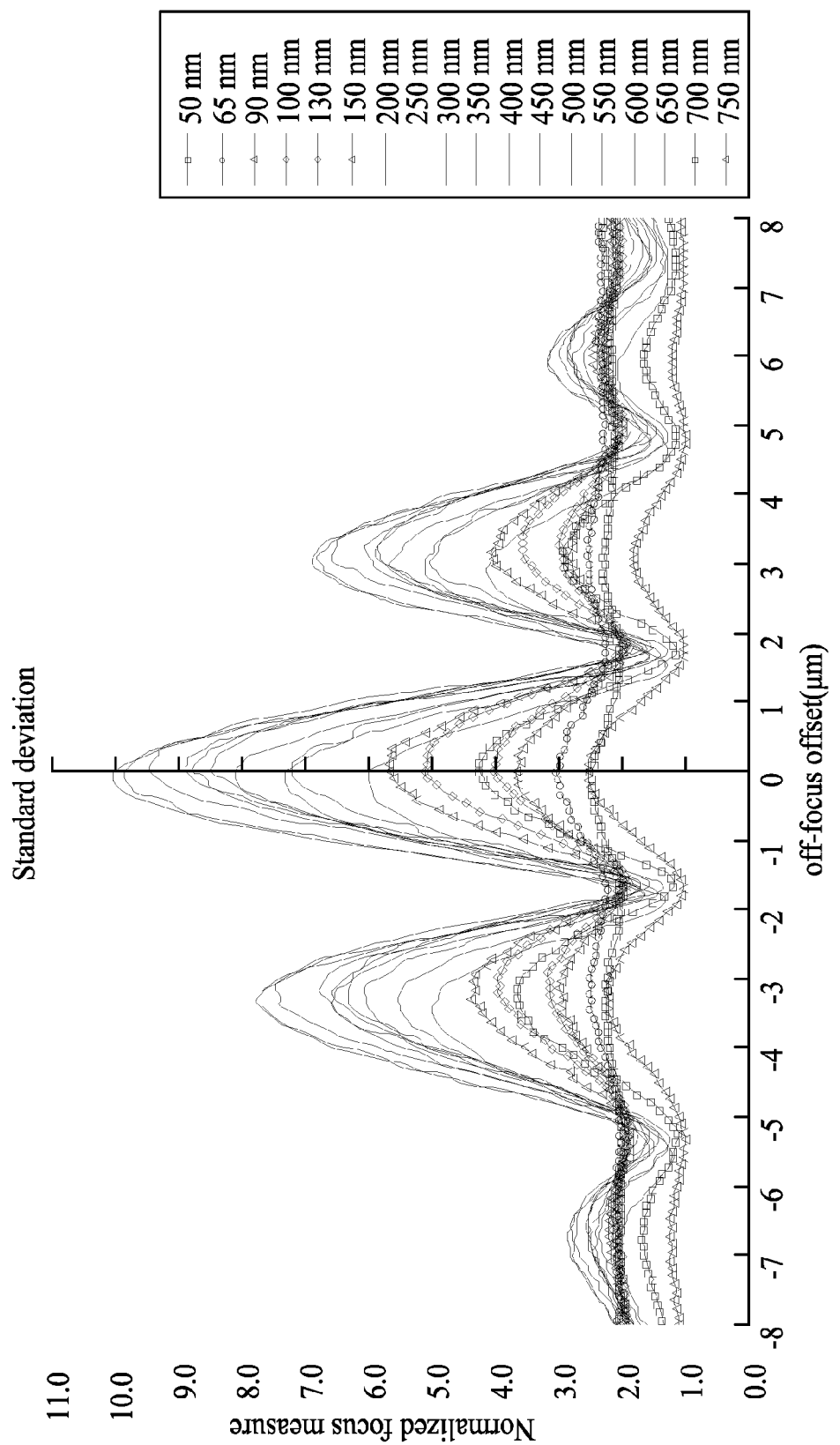
FIG. 8(a) and FIG. 8(b) show graph illustrations of the variation of the relation curve of the focus measure and the off-focus offset as the line width of the grating pattern varies according to one embodiment of the present invention.
Figure 8B:
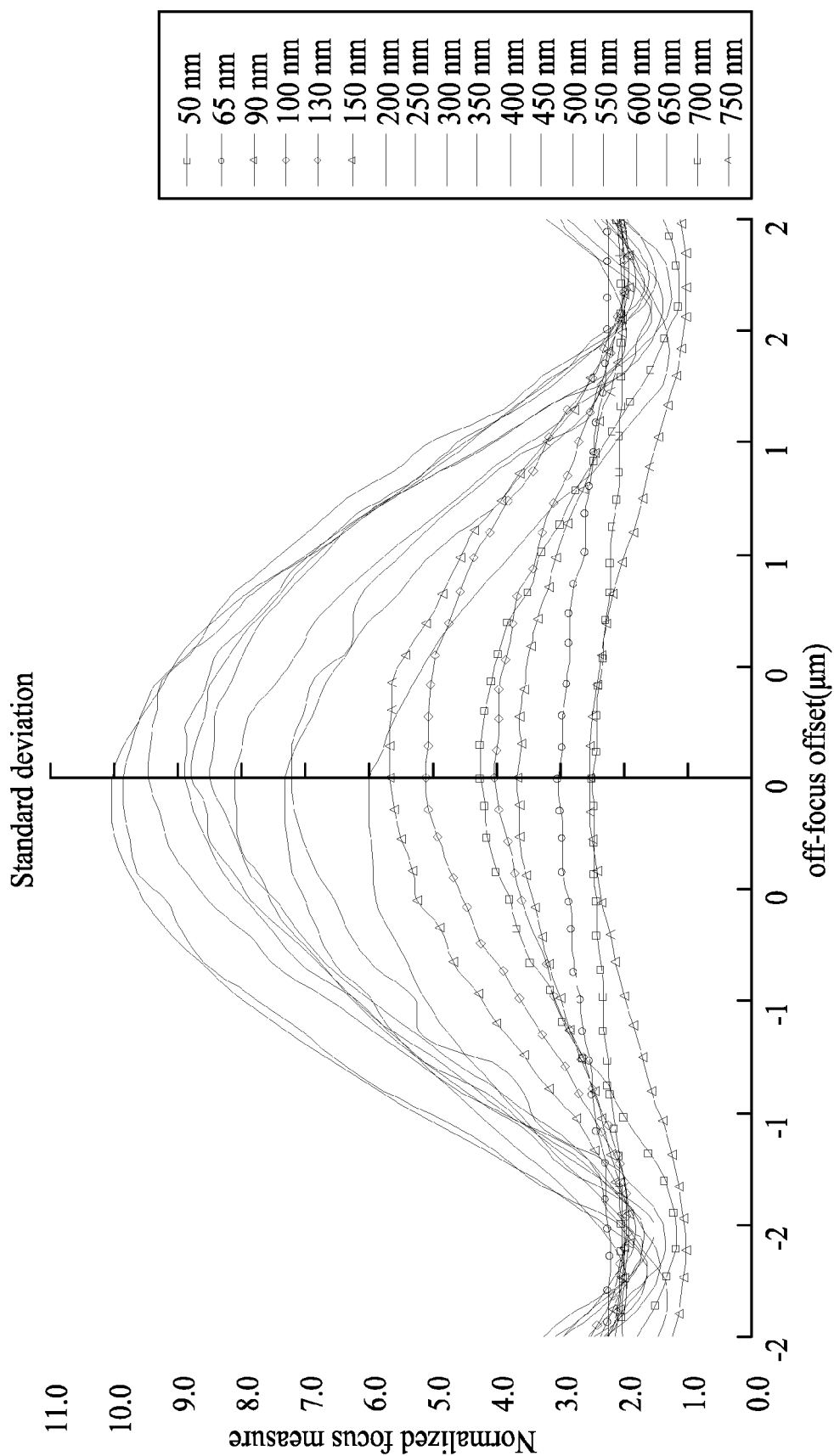

FIG. 8(a) and FIG. 8(b) show the variation of the distribution curve of the focus measure and the off-focus offset as the line width of the grating pattern varies according to one embodiment of the present invention. In comparison with the distribution curve of a given line width and pitch in FIG. 7, the distribution curves are obtained from several gratings having the same pitch, but different line widths. The position having a zero off-focus offset can be defined in advance as the one having the best focus with respect to the optical system. In addition, the position having a zero off-focus offset can also be defined based on the distribution of the distribution curve, and setting the zero point of the x-axis at the best focus position of the distribution curve. Furthermore, the best focus position corresponds to the 0 order peak.

The distribution curves in FIG. 8(a) and FIG. 8(b) are obtained by the standard deviation method, which will be used in the following embodiment to describe the present invention. Changing the line width while keeping the pitch the same, for example the line width can be changed from 50 nm to 750 nm and the line-width increment is 50 nm, can generate different distributions of distribution curves, which is illustrated in FIG. 8(a). Each distribution curve in the focus metric distribution shows several peaks at the expected position, and the magnitude variation of the peaks varies as the line width changes. Particularly, the 0 order and the ±1 order change significantly, as best shown in FIG. 8(b), a close up diagram of the 0 order of the FIG. 8(a). As a result, the magnitude variation relates to that of the line width in statistic view.

The inventors of the present invention find the relationship between the variation of the peak magnitude and that of the line width after several researches, and the relationship is used as the basis of the critical dimension measurement. Referring to the focus metric distributions in FIG. 8(a) and FIG. 8(b), the 0 order peak can be considered as a target order, and the following calculation is performed based on the data in the target order. To perform the subsequent calculation, a characteristic value needs to be decided to show the variation degree of the line width, and it is preferred to use the peak value of the target order. Particularly, the focus measure at the position having zero off-focus offset or substantially zero off-focus offset can also be used to perform the calculation. In addition, the entire curve may also be used to perform the calculation to generate a reference value relating to the variation of the line width. In other words, the characteristic value can be obtained in many ways. Using the peak value of the 0 order peak is simple, and the following description uses the peak value of the 0 order peak as the characteristic value.

Figure 9A:
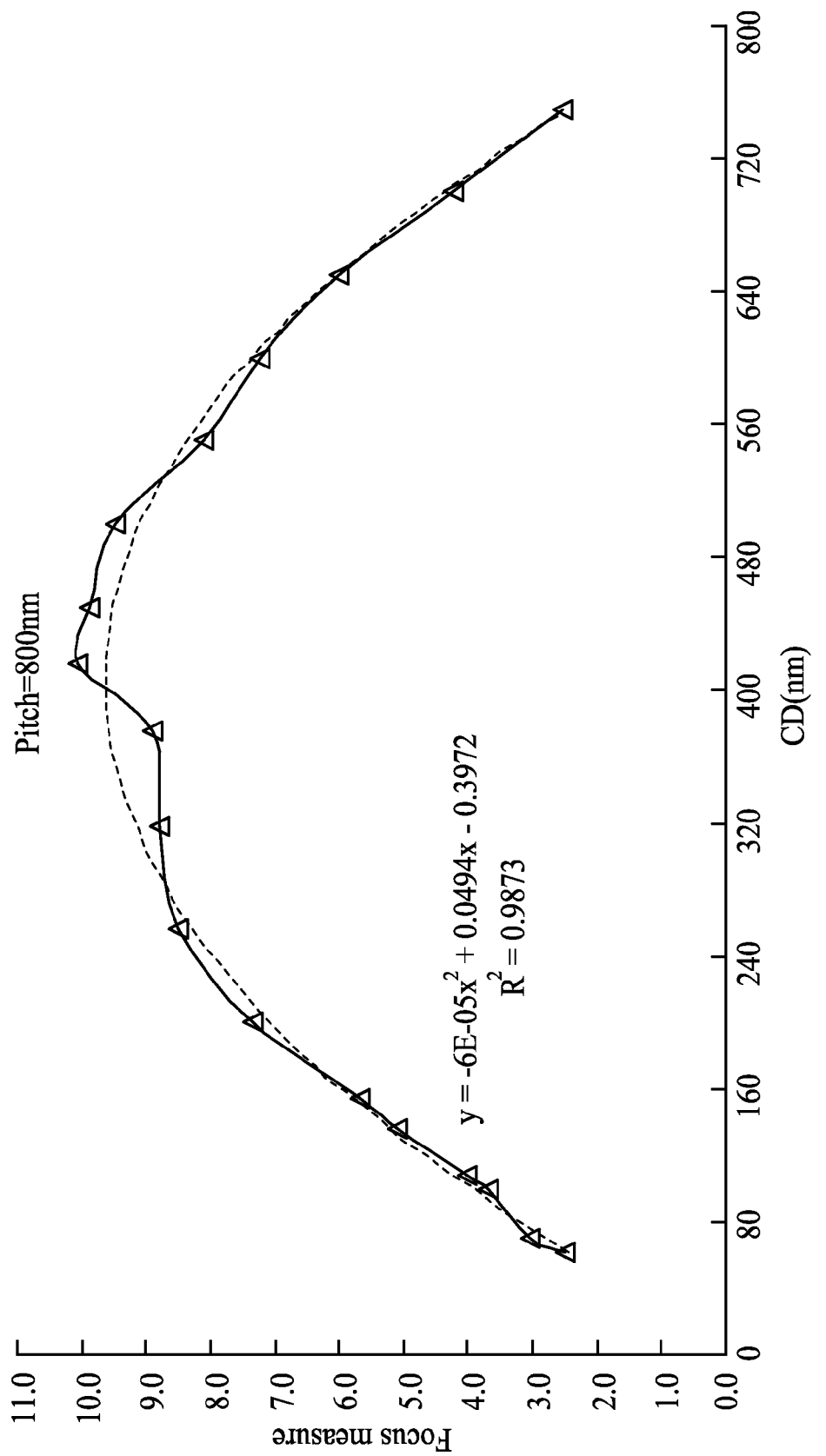
FIG. 9(a) to FIG. 9(d) show graph illustrations of the relationship of the characteristic value and the critical dimension at different pitches according to one embodiment of the present invention.
Figure 9B:
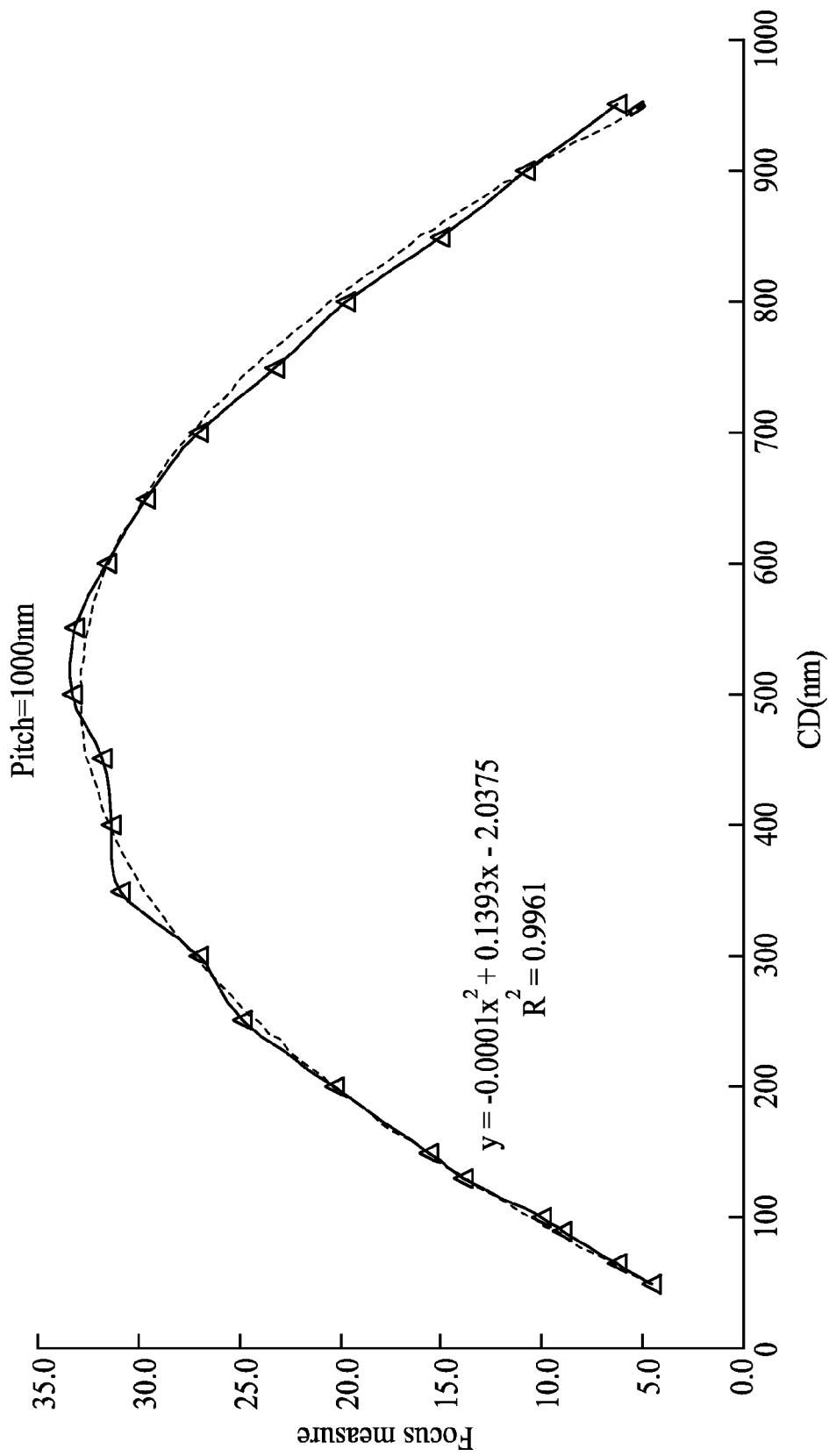
Figure 9C:
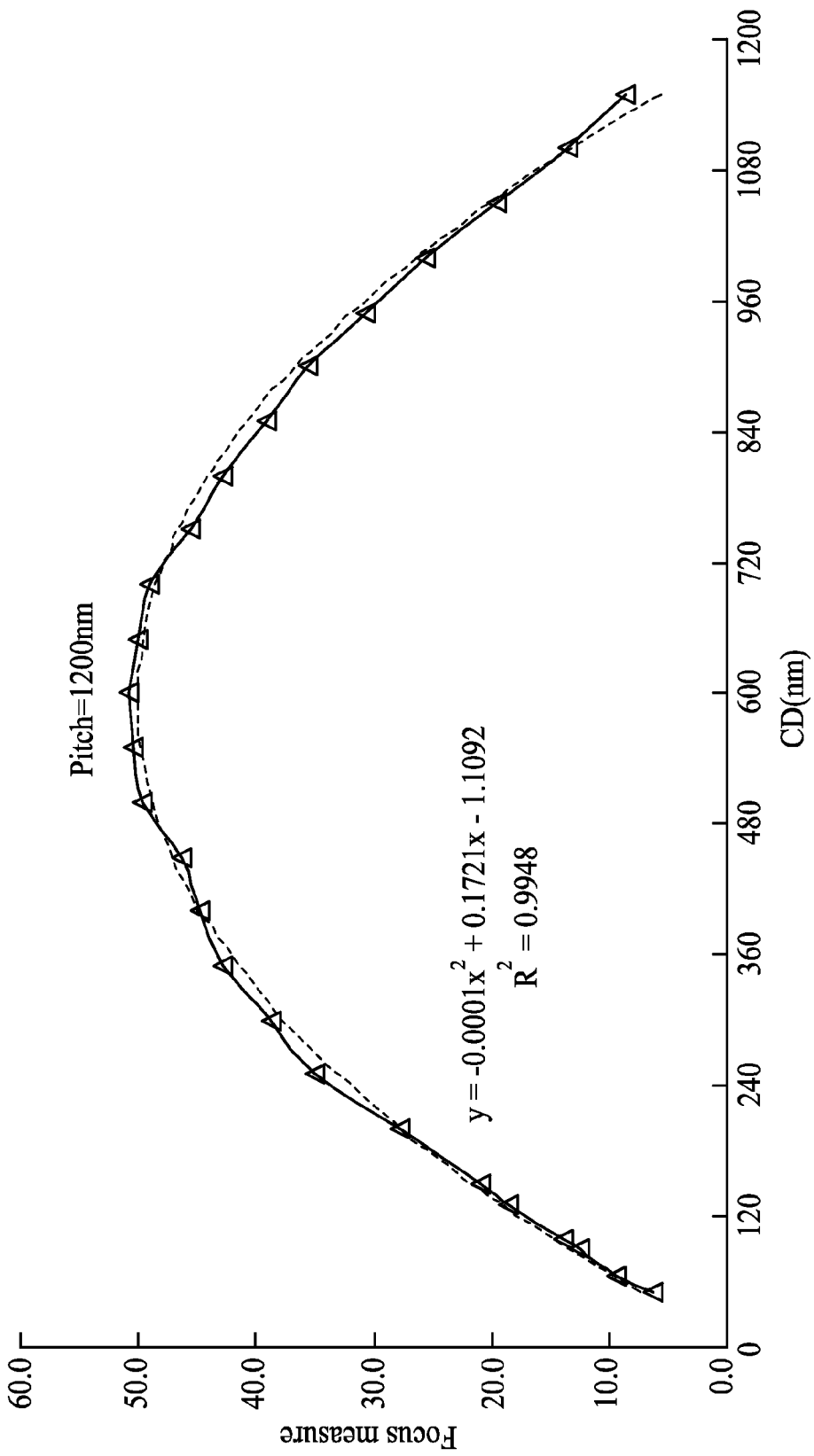
Figure 9D:
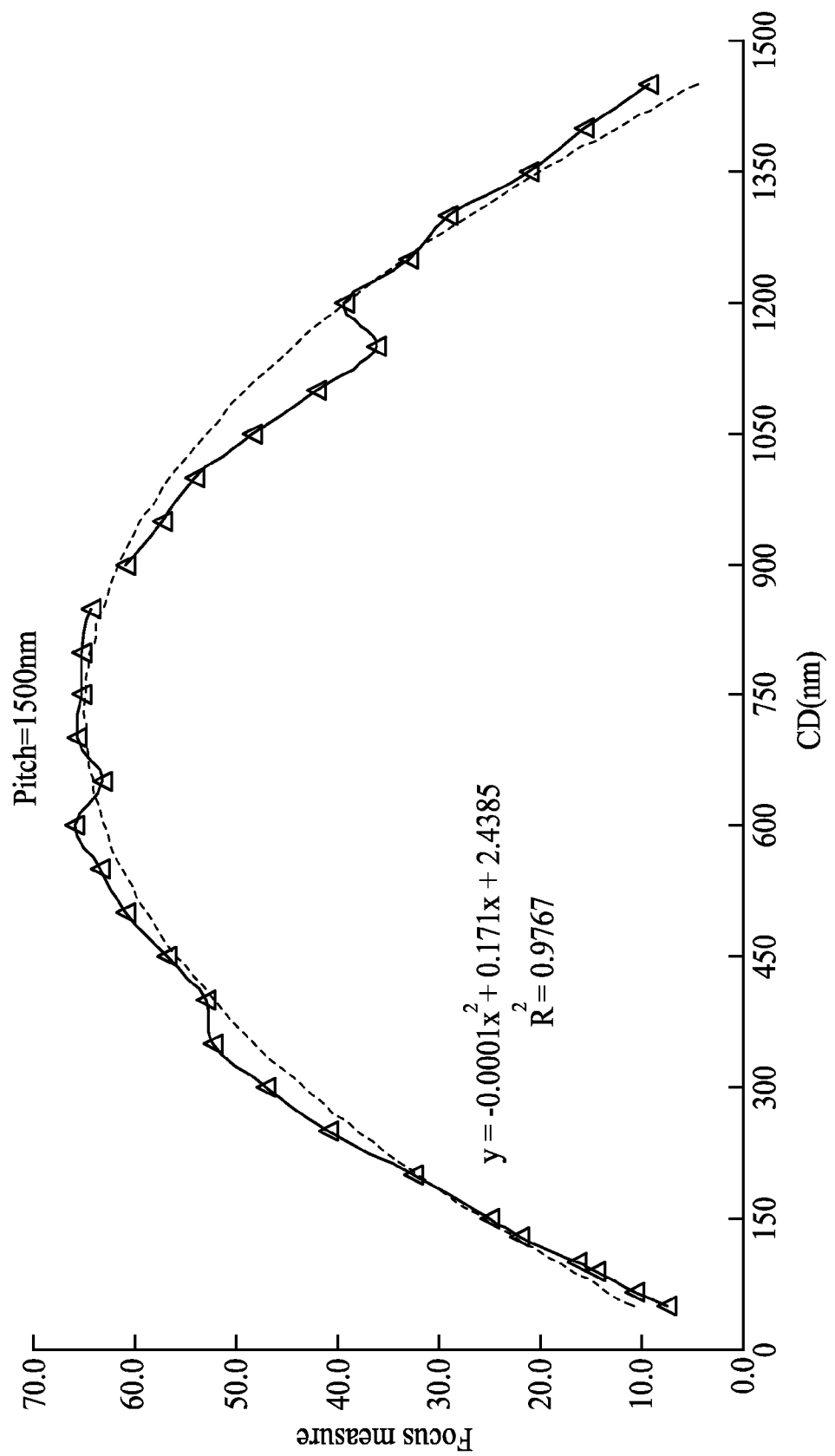

FIG. 9(a) to FIG. 9(d) show the relationship of the characteristic value and the critical dimension at different pitches according to one embodiment of the present invention. The line width is a critical dimension of the standard grating pattern. In semiconductor fabrication technology, the minimum line width is defined as the critical dimension. Consequently, changing the line width of the standard grating pattern 158 corresponds to changing the critical dimension. Referring to FIG. 9(a), the line width changes from 50 nm to about 750 nm with the same pitch, and the relation curve (reference relation) represents the focus measure and the critical dimension in the target order, i.e., the 0 order. The relation curve at other pitches 1000 nm, 1200 nm and 1500 nm are shown in FIG. 9(b) to FIG. 9(d), respectively. The distribution of the relation curve is in a parabolic form, which can be described by a parabolic equation. A curve-fitting process is performed to generate a parabolic equation, wherein y represents the focus measure, x represents the critical dimension, and the standard deviation R is within a reasonable scale. As a result, the curve-fitted parabolic equation can be used as a representative of the measured data in the subsequent calculation.

Note that it is feasible to using the curve-fitting process to generate a representative equation, but this is not the only way to do so, and the equation may not be of a parabolic form. However, the curve-fitting process can decrease system errors, which are well known in statistics and not described in detail herein. In other words, the data in FIG. 9(a) to FIG. 9(d) can be stored in a database, and a measuring unit configured to acquire a measured characteristic value of a sample object may determine the critical dimension of the sample object in reference to the data stored in the database.

When an optical system measures the sample object and acquires a measured characteristic value, then the x value, i.e., the critical dimension, of the parabolic equation can be calculated by the known y value. The conventional image metrology tools are restricted by the diffraction effect from determining a line width smaller than the resolution of the metrology tools. Particularly, the conventional image metrology tools use the visible ray having a resolution limit of about several hundred nanometers; however, the present invention can measure a critical dimension smaller than a hundred nanometers, far smaller than the resolution limit of the metrology tools.

Referring back to FIG. 8(a) and 8(b), the target order may use the +1 order or the −1 order instead of the 0 order. Furthermore, the above-described embodiment uses the focus measure obtained from the focus metric algorithms directly without undergoing a normalizing process, which is commonly used in data processing.

Figure 10:
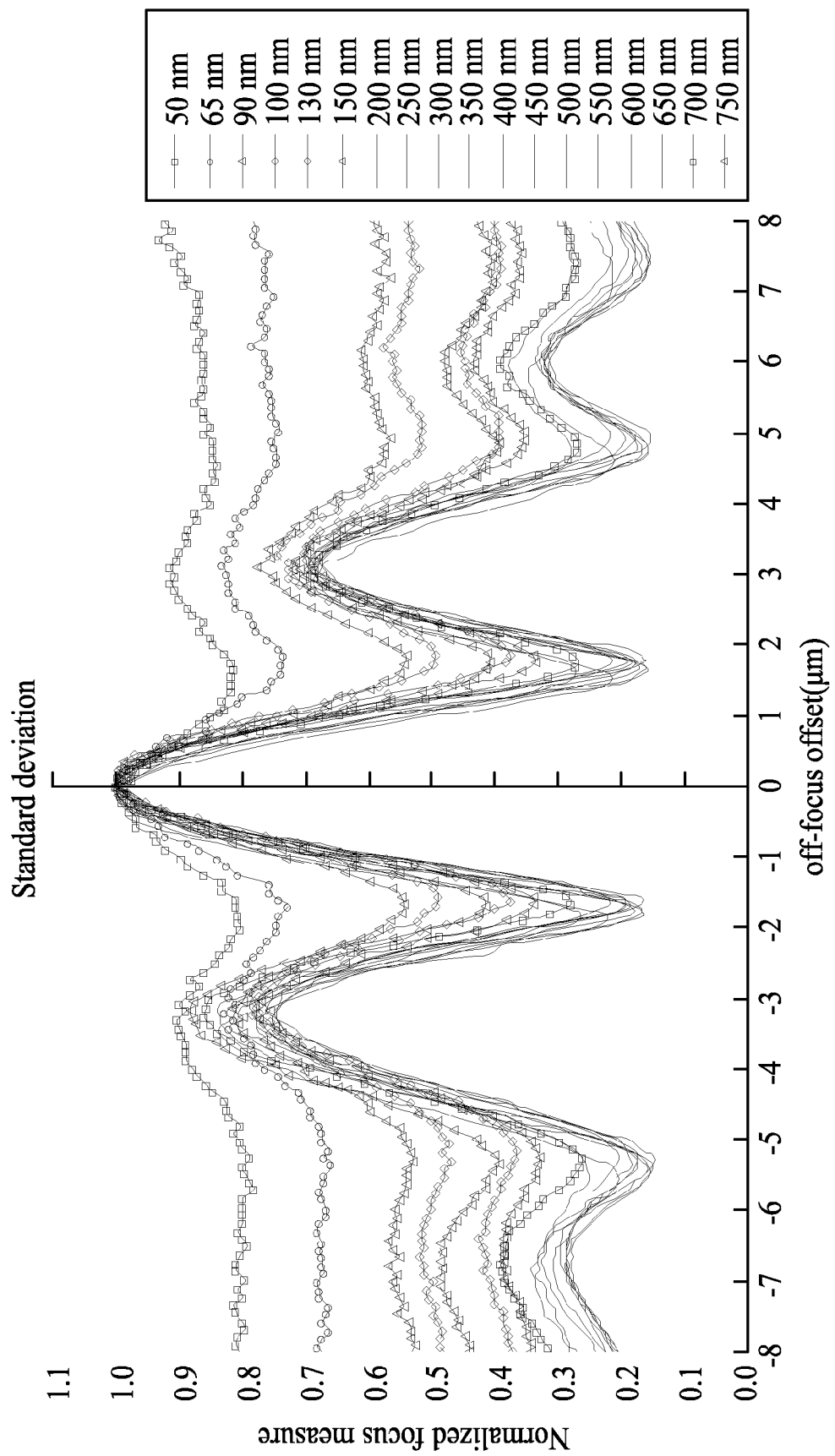
FIG. 10 shows a graph illustration of the variation of the relation curve of the normalized focus measure and the off-focus offset as the line width of the grating pattern varies according to one embodiment of the present invention.

FIG. 10 shows the variation of the relation curves of the normalized focus measure and the off-focus offset as the line width of the grating pattern varies according to one embodiment of the present invention. The 0 order does not vary due to being normalized to 1, and the other orders such as the +1 order and −1 order vary as the line width changes. Consequently, orders other than the 0 order can be used as the target order. In addition, the valleys, i.e., the local minimum, between the peaks are considered as the ±1 order valleys, the ±2 order valleys, and so forth. The normalized focus measure of the valley also corresponds to the line width, and can be used to calculate the critical dimension as described in the above description.

Figure 11:
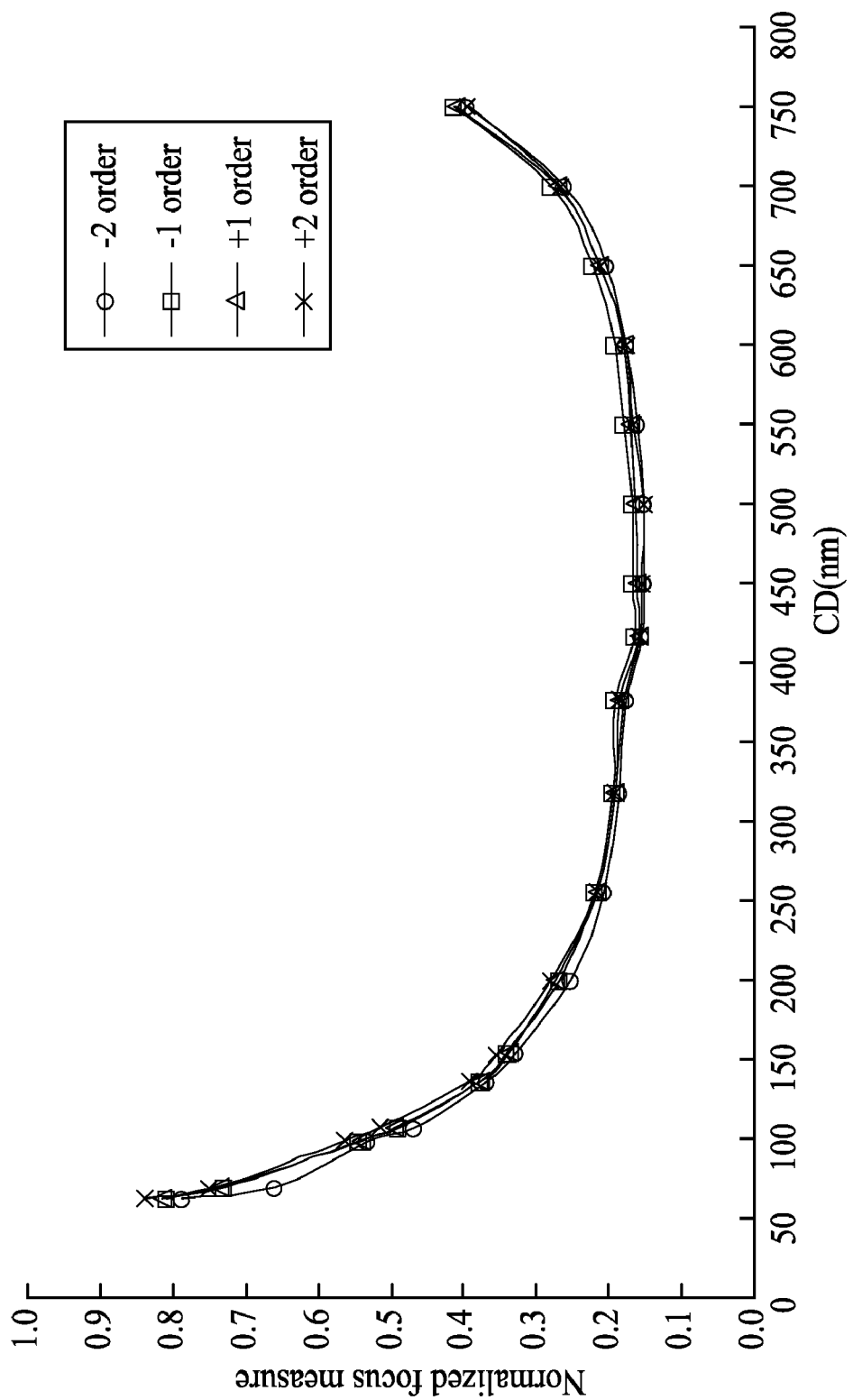
FIG. 11 shows a graph illustration of the relation curve of the normalized characteristic value and the critical dimension according to one embodiment of the present invention.

FIG. 11 shows the relation curves of the normalized characteristic value and the critical dimension according to one embodiment of the present invention. The peak value is used as the characteristic value, for example, using the peak values of the ±1 order peaks or the ±2 order peaks to calculate the normalized characteristic values. The distribution of the relation curves appears that they are substantially the same. In other words, any one of the relation curves of the ±1 order peaks or the ±2 order peaks in FIG. 11 can be used as the relation curve of the target order. The relation curves in FIG. 11 are obviously not parabolic, and a statistic numerical calculation can be used to smooth the curve for subsequent calculation. Furthermore, the valleys or peaks can also be used as the target order, and particularly any parameters relating to the variation of the line width can also be used.

All data shown in FIG. 8(a) to FIG. 11 can be stored in a database of an optical measuring system or other analyzing unit. As the optical measuring system acquires the focus metric distribution of the sample object, the critical dimension of the sample object can then be determined based on the data in the database. Particularly, if the critical dimension is smaller than 50 nm, i.e., smaller than the available critical dimension in the database, the present invention can also be used by extrapolation. Consequently, the present invention can measure the critical dimension smaller than the resolution limit of the image metrology tools. In addition to being used in semiconductor fabrication, the present invention can also be applied to other processes that need to measure critical dimensions.

In addition, the characteristic value of the present invention may use physical parameters other than the specific peak value or valley value obtained from the specific focus metric algorithm. If the variation of the physical parameter relates to that of the line width, the physical parameter can be used to generate the content of the database, and the critical dimension or other structural parameters of an unknown grating structure can be determined in reference to the content of the database. Furthermore, the optical system of the present invention can be used to measure the critical dimension of the sample object, and the optical system is configured to perform the above-mentioned calculation. The optical system can include a database configured to store the characteristic relation curve of the pitch, and a measuring unit configured to acquire a measured characteristic value of the sample object. The characteristic relation curve correlates a characteristic value with the pitch, and the critical dimension of the sample object is determined based on the characteristic value and the characteristic relation curve.

The above-mentioned characteristic value is preferably an extreme value calculated by a predetermined focus metric algorithm, and the extreme value can be a peak value or a valley value. The characteristic value can use the 0 order peak value, the +1 order peak value, the −1 order peak value, or one of the valley values. In other words, the extreme value represents a peak value or the valley value. In conclusion, the present method and system for measuring dimensions use the through focus image-capturing technique and the focus metric algorithms to acquire the relationship between the characteristic value (focus measure) and the structural parameters such as the critical dimension, and the relationship can be then used to determined the structural parameter of the unknown object based on the measured characteristic value. Consequently, the present invention can dramatically increase the measuring efficiency and the sensitivity of the critical dimension without amending the hardware architecture of the conventional image metrology tools.

The above-described embodiments of the present invention are intended to be illustrative only. Numerous alternative embodiments may be devised by those skilled in the art without departing from the scope of the following claims.

We claim:

1. A method of measuring dimensions for an optical system so as to measure a critical dimension of a sample object comprising:
preparing a plurality of standard objects, each of said plurality of standard objects having a grating-shaped standard pattern with a predetermined pitch and line width;
selecting a predetermined focus metric algorithm;
performing an analyzing process on each of said plurality of standard objects comprising:
moving the standard object to a plurality of predetermined off-focus positions with respect to an on-focus position of the optical system;
capturing a plurality of off-focus images of the standard object on the predetermined off-focus positions using the optical system; and
analyzing the off-focus images using the predetermined focus metric algorithm to generate a plurality of distributions of focus metric values on the predetermined off-focus positions, each of said plurality of distributions of focus metric values having at least one extreme value;
analyzing said plurality of distributions of focus metric values to determine target orders from the extreme value and a plurality of characteristic values corresponding to the target orders of said plurality of distributions of focus metric values;
generating a reference relation correlating the characteristic values with the line widths of the standard objects;
measuring the sample object to acquire a measured characteristic value; and
determining the critical dimension of the sample object based on the measured characteristic value and the reference relation.

2. The method of measuring dimensions of claim 1, wherein the step of generating a reference relation comprises curve fitting to generate a relation curve correlating the characteristic values with the line widths of the standard objects.

3. The method of measuring dimensions of claim 1, wherein the step of generating the reference relation further comprises correlating the characteristic values with the pitches of the standard objects.

4. The method of measuring dimensions of claim 1, wherein the target order is one of a zero order peak, a positive first order peak, and a negative first order peak.

5. The method of measuring dimensions of claim 1, wherein the characteristic values are obtained by the focus metric algorithm and correspond to the extreme values of the target orders.

6. The method of measuring dimensions of claim 1, wherein the characteristic values are obtained by the focus metric algorithm and correspond to one of the predetermined off-focus positions in the target order.

7. The method of measuring dimensions of claim 1, wherein the predetermined off-focus positions use the on-focus position as a reference position.

8. The method of measuring dimensions of claim 1, wherein the target order is determined by the steps of:
normalizing the focus metric distribution based a zero order peak thereof; and
selecting a peak or a valley other than the zero order peak as the target order.

9. The method of measuring dimensions of claim 8, wherein the characteristic values are obtained by the focus metric algorithm and correspond to peak values of the target orders.

10. The method of measuring dimensions of claim 8, wherein the focus metric algorithm is one of a gradient energy method, a Laplacian method, a standard deviation method, and a contrast method.

11. A method of measuring dimensions for an optical system to measure a critical dimension of a sample object comprising:
using the optical system to capture a plurality of off-focus images from a plurality of objects, each object having a grating-shaped standard pattern with a predetermined pitch and a plurality of line widths;
using an algorithm to analyze the off-focus images to generate a plurality of characteristic distributions corresponding to the line widths;
determining characteristic values for the plurality of characteristic distributions to generate a relation curve of the characteristic values and the line widths;
measuring the sample object to acquire a measured characteristic value; and
determining a critical dimension of the sample object based on the measured characteristic value and the relation curve.

12. The method of measuring dimensions of claim 11, wherein the plurality of characteristic distributions are obtained by a focus metric algorithm.

13. The method of measuring dimensions of claim 11, wherein the algorithm is one of a gradient energy method, a Laplacian method, a standard deviation method, and a contrast method.

14. The method of measuring dimensions of claim 11, wherein each characteristic distribution includes a plurality of peaks and valleys.

15. The method of measuring dimensions of claim 14, wherein the characteristic values for the characteristic distribution correspond to one of peaks and valleys.

16. The method of measuring dimensions of claim 14, wherein the characteristic values are the peaks or the valleys other than a zero order peak of the plurality of characteristic distributions after normalizing the plurality of characteristic distributions.

17. The method of measuring dimensions of claim 14, wherein the characteristic values for the plurality of characteristic distributions are peaks or valleys of the characteristic distributions before a normalizing process.

18. An optical system of measuring dimensions of a sample object comprising:
a database configured to store at least one characteristic relation curve of a pitch, the characteristic relation curve correlating a characteristic value with the pitch; and
a measuring unit configured to acquire a measured characteristic value of the sample object, wherein a critical dimension of the sample object is determined based on the measured characteristic value and the characteristic relation curve;
using the optical system to capture a plurality of off-focus images from a plurality of objects, each object having a grating-shaped standard pattern with a predetermined pitch and a plurality of line widths; and an algorithm to analyze the off-focus images to generate a plurality of characteristic distributions corresponding to the line widths.

19. The optical system of measuring dimensions of claim 18, wherein the characteristic value is an extreme value obtained by a focus metric algorithm.

20. The optical system of measuring dimensions of claim 18, wherein the characteristic value corresponds to one of peaks or valleys of the characteristic relation curve.

* * * * *

UNITED STATES PATENT AND TRADEMARK OFFICE
CERTIFICATE OF CORRECTION

PATENT NO. : 7,619,753 B2  Page 1 of 1
APPLICATION NO. : 11/465802
DATED : November 17, 2009
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 396 days.

Signed and Sealed this

Twenty-sixth Day of October, 2010

David J. Kappos
*Director of the United States Patent and Trademark Office*